United States Patent
Bachar

(10) Patent No.: US 6,186,412 B1
(45) Date of Patent: Feb. 13, 2001

(54) GENERATING DYNAMICALLY CONTROLLABLE OSCILLATORY FLUID FLOW

(75) Inventor: Tomer Bachar, Zur Yegal (IL)

(73) Assignee: Ramot University Authority for Applied Research and Industrial Development, Tel Aviv (IL)

( * ) Notice: Under 35 U.S.C. 154(b), the term of this patent shall be extended for 0 days.

(21) Appl. No.: 09/412,424

(22) Filed: Oct. 5, 1999

Related U.S. Application Data

(60) Provisional application No. 60/103,053, filed on Oct. 5, 1998.

(51) Int. Cl.[7] ............................................ B05B 1/02
(52) U.S. Cl. .................... 239/102.1; 239/11; 239/124; 244/199
(58) Field of Search ................. 239/102.1, 1, 4, 239/11, 124; 244/204, 203, 199

(56) References Cited

U.S. PATENT DOCUMENTS

| | | | |
|---|---|---|---|
| 4,941,398 | * 7/1990 | Morris et al. | 239/102.1 X |
| 5,209,438 | 5/1993 | Wygnanski . | |
| 5,259,815 | * 11/1993 | Stouffer et al. | 239/102.1 X |

* cited by examiner

*Primary Examiner*—Lesley D. Morris
(74) *Attorney, Agent, or Firm*—Mark M. Friedman

(57) ABSTRACT

A method for generating dynamically controllable oscillatory fluid flow, and corresponding device and system for implementing the method thereof. Based on a unique configuration and operation of a driver, a chopper, a flow guide, and connectors, or, alternatively, a combined driver/chopper unit, a flow guide, and connectors, for generating dynamically controllable oscillatory fluid flow, in a simple and efficient manner, featuring the capability of producing a zero mean oscillatory fluid flow rate, and oscillation parameters of high frequency, up to about 1 kHz, high amplitude, and variable wave form. Optional valves are included in the device for increasing the range of mean rate of oscillatory fluid flow. From a constant circulatory fluid flow, a component of oscillatory fluid flow is generated and is dynamically controllable according to the structure, configuration, and operation of the chopper and chopper components. Use of a flow guide in the device simply enables directional control or guidance of the oscillatory fluid flow component, by separating the oscillatory fluid flow component from the constant circulatory fluid flow, in order for the oscillatory fluid flow component to exit the device for input into another device or system utilizing the oscillatory fluid flow, according to a particular application. The invention is particularly applicable for achieving high levels of dynamically controllable oscillatory fluid flow, enabling improving performance of aerodynamic objects such as aircraft wings, translating to improving flight safety and efficiency.

38 Claims, 6 Drawing Sheets

GENERATING DYNAMICALLY CONTROLLABLE OSCILLATORY FLUID FLOW

This application claims benefit of provisional application No. 60/103,053, filed Oct. 5, 1998.

FIELD AND BACKGROUND OF THE INVENTION

The present invention relates to controlling fluid flow and, more particularly, to a method for generating dynamically controllable oscillatory fluid flow, in a simple and efficient manner, featuring the capability of producing a zero mean oscillatory fluid flow rate, and oscillation parameters of high frequency, up to about 1 kHz, high amplitude, and variable wave form, and corresponding device and system for implementing the method thereof.

Currently, an important application of generating oscillatory fluid flow is for achieving high levels of dynamically controllable fluid flow, where it has been shown that oscillatory fluid flow at a controllable mean flow rate, frequency, amplitude, and waveform, significantly improves the performance of aerodynamic objects such as aircraft wings. In particular, using dynamically controllable oscillatory fluid flow significantly improves aerodynamic behavior of an aircraft during take-off and landing, with regard to aircraft stability and flight efficiency, translating to improved safety and fuel savings, respectively.

Employing methods and/or devices based on generating dynamically controllable oscillatory fluid flow in a variety of applications, represents a substantial improvement over using currently known methods and/or devices for dynamically controlling fluid flow. For example, the commonly known method of 'steady blowing', based on non-oscillatory fluid flow, can be used for controlling flow separation, and features a powerful driver such as part of a jet engine, for generating very high constant and uniform flow rates having essentially no amplitude. This method is limited by the need to use a very powerful driver for generating high flow rates. For similar types of aerodynamic applications of delaying flow separation, oscillatory blowing has zero mean flow rate, requiring only about 10 per cent of the momentum involved in steady blowing methods, in order to achieve the same affect of flow separation such as lift or drag.

Currently existing devices for generating oscillatory fluid flow include loudspeakers enclosed in a box, a T-valve, a disc valve, a disc valve featuring a membrane, and a piezoelectric (PZE) oscillator. These devices present a variety of significant limitations for achieving high levels of dynamically controllable fluid flow. They generate oscillatory fluid flow with a limited range of frequencies, and the amplitude of the oscillatory fluid flow decreases with increasing frequency. In some cases the oscillatory fluid flow is generated and superimposed on an existing non-oscillatory constant flow rate of high magnitude, impairing practical implementation for dynamic control of fluid flow. Attempts to solve those problems have usually resulted in cumbersome and operationally complex devices.

Loudspeakers enclosed in a box, used for generating oscillatory fluid flow of air, as taught by Nishri, doctoral dissertation, Tel Aviv University, Israel, 1995, is limited to oscillation frequencies less than 100 Hz, unless the device includes very large water cooled loudspeakers of diameter greater than 50 cm.

The T-valve, used for chopping air flow, developed by Sokolov and Bachar, 1992, and described by Seifert et al. in AIAA J., 31, 2052 (1994), is limited to oscillation frequencies less than 400 Hz.

The disc valve, also used for chopping air flow, developed by Seifert and Bachar, 1994, and disclosed by Hites et al., DFD97 APS Meeting, USA, 1997, enables generating oscillatory fluid flow having high frequencies. However, the oscillatory fluid flow is significantly limited by being superimposed onto an existing non-oscillatory constant flow rate having the same order of magnitude as the wave amplitude of the oscillatory flow. To solve the problem of interference due to the presence of the exiting constant flow rate, a membrane is added to the disc valve such as to enable separation between the constant and oscillatory flow components. Undesirably, however, the added membrane substantially attenuates the wave amplitude. It is also necessary to balance the pressure on either side of the membrane, in order to avoid membrane rupture. Moreover, additional problems can arise when using a membrane in a low-temperature environment, for example, during conditions of operating an aircraft.

There is thus a widely recognized need for, and it would be highly advantageous to have, a method for generating dynamically controllable oscillatory fluid flow, in a simple and efficient manner, featuring the unique capability of producing a zero mean oscillatory fluid flow rate, and oscillation parameters of high frequency, up to about 1 kHz, high amplitude, and variable wave form, and corresponding device and system for implementing the method thereof.

SUMMARY OF THE INVENTION

The present invention relates to a method for generating dynamically controllable oscillatory fluid flow, and corresponding device and system for implementing the method thereof. The present invention is based on a unique configuration and operation of a driver, a chopper, a flow guide, and connectors, or, alternatively, a combined driver/chopper, a flow guide, and connectors, for generating dynamically controllable oscillatory fluid flow, in a simple and efficient manner, featuring the capability of producing a zero mean oscillatory fluid flow rate, and oscillation parameters of high frequency, up to about 1 kHz, high amplitude, and variable wave form. Optional valves are included in the device for increasing the range of mean rate of oscillatory fluid flow.

From a constant circulatory fluid flow, a component of oscillatory fluid flow is generated and is dynamically controllable according to the structure, configuration, and operation of the chopper and chopper components. Use of a flow guide in the device simply enables directional control or guidance of the oscillatory fluid flow component, by separating the oscillatory fluid flow component from the remaining constant circulatory fluid flow, in order for the oscillatory fluid flow component to exit the device for input into another device or system utilizing the oscillatory fluid flow, according to a particular application.

It is therefore an object of the present invention to provide a method, device, and system for generating dynamically controllable oscillatory fluid flow.

It is a further object of the present invention to provide a method, a device, and a system for generating dynamically controllable oscillatory fluid flow, featuring the capability of producing variable mean flow rate, and oscillation parameters of variable frequency, variable amplitude, and variable wave form.

It is a further object of the present invention to provide a method, a device, and a system for generating dynamically controllable oscillatory fluid flow, featuring the capability of producing a zero mean flow rate, and oscillation parameters of high frequency, up to about 1 kHz, high amplitude, and variable wave form.

Thus, according to the present invention, there is provided a method for generating dynamically controllable oscillatory fluid flow featuring oscillation parameters of variable frequency, variable amplitude, variable wave form, and variable mean flow rate, comprising the steps of: (a) driving a constant circulator fluid flow along a circuitous flow path by using a driver; (b) chopping the constant circulatory fluid flow by using a chopper, thereby generating the dynamically controllable oscillatory fluid flow from the constant circulatory fluid flow, such that the fluid flow becomes a superposition of two fluid flow components, first component is the dynamically controllable oscillatory fluid flow, second component is remaining constant circulatory fluid flow; (c) guiding the superposition of the two fluid flow components and dividing the superposition of the two fluid flow components into the first component of the dynamically controllable oscillatory fluid flow end into the second component of the remaining constant circulatory fluid flow; and (d) guiding the first component of the dynamically controllable oscillatory fluid flow to exit the circuitous flow path and the second component of the remaining constant circulatory fluid flow to return to the driver.

According to further features in preferred embodiments of the method described below, the step of driving the constant circulatory fluid flow includes controlling flow rate and amplitude of the constant circulatory fluid flow according to power level of the driver.

According to still further features in the described preferred embodiments of the method, the driver is selected from the group consisting of a bellows, a blower, a compressor, and a pump.

According to still further features in the described preferred embodiments of the method, the step of chopping the constant circulator fluid flow is effected in a mode selected from the group consisting of a periodic mode and an aperiodic mode, such that corresponding oscillations of the dynamically controllable oscillatory fluid flow are selected from the group consisting of periodic oscillations and aperiodic oscillations.

According to still further features in the described preferred embodiments of the method, the oscillation parameters of variable frequency, variable amplitude, variable wave form, and variable mean flow rate of the dynamically controllable oscillatory fluid flow are controllable by varying a chopper parameter selected from the group consisting of chopper operation, chopper structure, and chopper configuration.

According to still further features in the described preferred embodiments of the method, the chopper is selected from the group consisting of a disk valve chopper, a T valve chopper, a butterfly chopper, and a reed valve chopper.

According to still further features in the described preferred embodiments of the method, the step of guiding the superposition of the two fluid flow components and dividing the superposition of the two fluid flow components into the first component of the dynamically controllable oscillatory fluid flow and into the second component of the remaining constant circulatory fluid flow is effected by a flow guide, the flow guide includes a bifurcation.

According to still further features in the described preferred embodiments of the method, flow rate and amplitude of the constant circulatory fluid flow, the first component of the dynamically controllable oscillatory fluid flow, and the second component of the remaining constant circulatory fluid flow are controllable by using at least one three-way valve positioned in-line along the circuitous flow path.

According to another aspect of the present invention, there is provided a method for generating dynamically controllable oscillatory fluid flow featuring oscillation parameters of variable frequency, variable amplitude, variable wave form, and variable mean flow rate, comprising the steps of: (a) simultaneously driving and chopping a constant circulatory fluid flow along a circuitous flow path by using a driver/chopper unit, thereby generating the dynamically controllable oscillatory fluid flow from the constant circulatory fluid flow, such that the fluid flow becomes a superposition of two fluid flow components, first component is the dynamically controllable oscillatory fluid flow, second component is remaining constant circulatory fluid flow; (b) guiding the superposition of the two fluid flow components and dividing the superposition of the two fluid flow components into the first component of the dynamically controllable oscillatory fluid flow and into the second component of the remaining constant circulatory fluid flow; and (c) guiding the first component of the dynamically controllable oscillatory fluid flow to exit the circuitous flow path and the second component of the remaining constant circulatory fluid flow to return to the driver/chopper unit.

According to further features in preferred embodiments of the method described below, the step of simultaneously driving and chopping the constant circulatory fluid flow includes controlling flow rate and amplitude of the constant circulatory fluid flow according to power level of the driver/chopper unit.

According to still further features in the described preferred embodiments of the method, the driver/chopper unit includes at least one movable element activated by a motor, type of the motor for activating the at least one movable element is selected from the group consisting of electrical, magnetic, electromagnetic, mechanical, and electromechanical, the electromagnetic motor includes a piezoelectric mechanism.

According to still further features in the described preferred embodiments of the method, the step of simultaneously driving and chopping the constant circulatory fluid flow is effected in a mode selected from the group consisting of a periodic mode and an aperiodic mode, such that corresponding oscillations of the dynamically controllable oscillatory fluid flow are selected from the group consisting of periodic oscillations and aperiodic oscillations.

According to still further features in the described preferred embodiments of the method, the oscillation parameters of variable frequency, variable amplitude, variable wave form, and variable mean flow rate of the dynamically controllable oscillatory fluid flow are controllable by varying a driver/chopper unit parameter selected from the group consisting of driver/chopper unit operation, driver/chopper unit structure, and driver/chopper unit configuration.

According to still further features in the described preferred embodiments of the method, the step of guiding the superposition of the two fluid flow components and dividing the superposition of the two fluid flow components into the first component of the dynamically controllable oscillatory fluid flow and into the second component of the remaining constant circulatory fluid flow is effected by a flow guide, the flow guide includes a bifurcation.

According to still further features in the described preferred embodiments of the method, flow rate and amplitude of the constant circulatory fluid flow, the first component of the dynamically controllable oscillatory fluid flow, and the second component of the remaining constant circulatory fluid flow are controllable by using at least one three-way valve positioned in-line along the circuitous flow path.

According to another aspect of the present invention, there is provided a device for generating dynamically controllable oscillatory fluid flow featuring oscillation parameters of variable frequency, variable amplitude, variable wave form, and variable mean flow rate, comprising: (a) a driver for driving a constant circulatory fluid flow along a circuitous flow path circuiting through the device; (b) a chopper for chopping the constant circulatory fluid flow, thereby generating the dynamically controllable oscillatory fluid flow from the constant circulatory fluid flow, such that the fluid flow becomes a superposition of two fluid flow components, first component is the dynamically controllable oscillatory fluid flow, second component is remaining constant circulatory fluid flow; (c) a flow guide for guiding the superposition of the two fluid flow components and dividing the superposition of the two fluid flow components into the first component of the dynamically controllable oscillatory fluid flow and into the second component of the remaining constant circulatory fluid flow; and (d) a plurality of connectors for guiding the fluid flow, the superposition of the two fluid flow components, and the two components of the fluid flow, including enabling the first component of the dynamically controllable oscillatory fluid flow to exit the device and the second component of the remaining constant circulatory fluid flow to return to the driver.

According to further features in preferred embodiments of the device described below, the driver controls flow rate and amplitude of the constant circulator fluid flow according to power level of the driver.

According to still further features in the described preferred embodiments of the device, the driver is selected from the group consisting of a bellows, a blower, a compressor, and a pump.

According to still further features in the described preferred embodiments of the device, the chopper chops the constant circulatory fluid flow in a mode selected from the group consisting of a periodic mode and an aperiodic mode, such that corresponding oscillations of the dynamically controllable oscillatory fluid flow are selected from the group consisting of periodic oscillations and aperiodic oscillations.

According to still further features in the described preferred embodiments of the device, the oscillation parameters of variable frequency, variable amplitude, variable wave form, and variable mean flow rate of the dynamically controllable oscillating fluid flow are controllable by varying a chopper parameter selected from the group consisting of chopper operation, chopper structure, and chopper configuration.

According to still further features in the described preferred embodiments of the device, the chopper is selected from the group consisting of a disk valve chopper, a T valve chopper, a butterfly chopper, and a reed valve chopper.

According to still further features in the described preferred embodiments of the device, the chopper operates according to a type of mechanism selected from the group consisting of electrical, magnetic, electromagnetic, mechanical, and electromechanical.

According to still further features in the described preferred embodiments of the device, the flow guide includes a bifurcation.

According to still further features in the described preferred embodiments of the device, flow rate and amplitude of the constant circulatory fluid flow, the first component of the dynamically controllable oscillatory fluid flow, and the second component of the remaining constant circulatory fluid flow are controllable by using at least one three-way valve positioned in-line along the circuitous flow path.

According to another aspect of the present invention, there is provided a device for generating dynamically controllable oscillatory fluid flow featuring oscillation parameters of variable frequency, variable amplitude, variable wave form, and variable mean flow rate, comprising: (a) a driver/chopper unit for simultaneously driving and chopping a constant circulatory fluid flow along a circuitous flow path circuiting through the device, thereby generating the dynamically controllable oscillatory fluid flow from the constant circulatory fluid flow, such that the fluid flow becomes a superposition of two fluid flow components, first component is the dynamically controllable oscillatory fluid flow, second component is remaining constant circulatory fluid flow; (b) a flow guide for guiding the superposition of the two fluid flow components and dividing the superposition of the two fluid flow components into the first component of the dynamically controllable oscillatory fluid flow and into the second component of the remaining constant circulatory fluid flow; and (c) a plurality of connectors for guiding the fluid flow, the superposition of the two fluid flow components, and the two components of the fluid flow, including enabling the first component of the dynamically controllable oscillatory fluid flow to exit the device and the second component of the remaining constant circulatory fluid flow to return to the driver/chopper unit.

According to further features in preferred embodiments of the device described below, the driver/chopper unit controls flow rate and amplitude of the constant circulatory fluid flow according to power level of the driver/chopper unit.

According to still further features in the described preferred embodiments of the device, the driver/chopper operates according to a type of mechanism selected from the group consisting of electrical, magnetic, electromagnetic, mechanical, and electromechanical.

According to still further features in the described preferred embodiments of the device, the driver/chopper unit chops the constant circulatory fluid flow in a mode selected from the group consisting of a periodic mode and an aperiodic mode, such that corresponding oscillations of the dynamically controllable oscillatory fluid flow are selected from the group consisting of periodic oscillations and aperiodic oscillations.

According to still further features in the described preferred embodiments of the device, the oscillation parameters of variable frequency, variable amplitude, variable wave form, and variable mean flow rate of the dynamically controllable oscillatory fluid flow are controllable by varying a driver/chopper unit parameter selected from the group consisting of driver/chopper unit operation, driver/chopper unit structure, and driver/chopper unit configuration.

According to still further features in the described preferred embodiments of the device, the flow guide includes a bifurcation.

According to still further features in the described preferred embodiments of the device, flow rate and amplitude of the constant circuitry fluid flow, the first component of the dynamically controllable oscillatory fluid flow, and the second component of the remaining constant circulatory fluid flow are controllable by using at least one three-way valve positioned in-line along the circuitous flow path.

According to another aspect of the present invention, there is provided a system for generating dynamically controllable oscillatory fluid flow featuring oscillation parameters of variable frequency, variable amplitude, variable wave form, and variable mean flow rate, the system comprising: (a) a device for generating the dynamically controllable oscillatory fluid flow; (b) at least one controller for activating and controlling components of the device in response to input controllable selected from the group consisting of commands, values, data, and signals; (c) a central processing unit for receiving, storing, and processing the input controllable and for sending the received, stored, and processed input controllable to the at least one controller; and (d) a plurality of control/data links for effecting electronic communication between the central processing unit and the at least one controller, and between the at least one controller and the components of the device.

According to further features in preferred embodiments of the system described below, the device includes: (i) ad river for driving a constant circulatory fluid flow along a circuitous flow path circuiting through the device; (ii) a chopper for chopping the constant circulatory fluid flow, thereby generating the dynamically controllable oscillatory fluid flow from the constant circulatory fluid flow, such that the fluid flow becomes a superposition of two fluid flow components, first component is the dynamically controllable oscillatory fluid flow, second component is remaining constant circulatory fluid flow; (iii) a flow guide for guiding the superposition of the two fluid flow components and dividing the superposition of the two fluid flow components into the first component of the dynamically controllable oscillatory fluid flow and into the second component of the remaining constant circulator fluid flow; and (iv) a plurality of connectors for guiding the fluid flow, the superposition of the two fluid flow components, and the two components of the fluid flow, including enabling the first component of the dynamically controllable oscillatory fluid flow to exit the device and the second component of the remaining constant circulatory fluid flow to return to the driver.

According to further features in preferred embodiments of the system described below, the flow guide of the device includes a bifurcation.

According to still further features in the described preferred embodiments of the device, flow rate and amplitude of the constant circulatory fluid flow, the first component of the dynamically controllable oscillatory fluid flow, and the second component of the remaining constant circulatory fluid flow are controllable by using at least one three-way valve positioned in-line along the circuitous flow path of the device.

According to still further features in the described preferred embodiments of the system, the device includes: (i) a driver/chopper unit for simultaneously driving and chopping a constant circulatory fluid flow along a circuitous flow path circuiting through the device, thereby generating the dynamically controllable oscillatory fluid flow from the constant circulatory fluid flow, such that the fluid flow becomes a superposition of two fluid flow components, first component is the dynamically controllable oscillatory fluid flow, second component is remaining constant circulatory fluid flow; (ii) a flow guide for guiding the superposition of the two fluid flow components and dividing the superposition of the two fluid flow components into the first component of the dynamically controllable oscillatory fluid flow and into the second component of the remaining constant circulatory fluid flow; and (iii) a plurality of connectors for guiding the fluid flow, the superposition of the two fluid flow components, and the two components of the fluid flow, including enabling the first component of the dynamically controllable oscillatory fluid flow to exit the device and the second component of the remaining constant circulatory fluid flow to return to the driver/chopper.

According to still further features in the described preferred embodiments of the system, the flow guide of the device includes a bifurcation.

According to still further features in the described preferred embodiments of the system, flow rate and amplitude of the constant circulatory fluid flow, the first component of the dynamically controllable oscillatory fluid flow, and the second component of the remaining constant circulatory fluid flow are controllable by using at least one three-way valve positioned in-line along the circuitous flow path of the device.

The present invention successfully addresses the shortcomings of currently known and used configurations for dynamically controlling oscillatory fluid flow, by providing an effective and efficient method, device, and system for generating dynamically controllable oscillatory fluid flow, featuring the capability of producing a zero mean oscillatory fluid flow rate, and oscillation parameters of high frequency, up to of about 1 kHz, high amplitude, and variable wave form.

Implementation of the method, device, and system of the present invention involves performing or completing selected tasks or steps manually, automatically, or a combination thereof. Moreover, according to actual instrumentation and equipment of a particular device or system, several selected steps of the method of the present invention could be implemented by hardware or by software on any operating system of any firmware or a combination thereof. Selected steps of the method of the invention could be described as being performed by a data processor, such as a computing platform for executing a plurality of instructions.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention relates to a method for generating dynamically controllable oscillatory fluid flow, featuring the capability of producing variable means oscillatory fluid flow rate, and oscillation parameters of variable frequency, variable amplitude, and variable wave form, and corresponding device for implementing the method thereof.

The present invention is based on a unique configuration and operation of a driver mechanism, a chopper mechanism, a flow guide, and connectors, for generating dynamically controllable oscillatory fluid flow, in a simple and efficient manner, featuring the capability of producing a zero mean oscillatory fluid flow rate, and oscillation parameters of high frequency, up to about 1 kHz, high amplitude, and variable wave form. From a constant circulatory fluid flow, a component of oscillatory fluid flow is generated and is dynamically controllable according to the structure, configuration, and operation of the chopper and chopper components. Use of a flow guide in the device simply enables directional control or guidance of the oscillatory fluid flow component, by separating the oscillatory fluid flow component from the remaining constant circulatory fluid flow, in order for the oscillatory fluid flow component to exit the device for input into another device or system utilizing the oscillatory fluid flow, according to a particular application.

It is to be understood that the invention is not limited in its application to the details of construction, arrangement, and composition of the components set forth in the following description and drawings. The invention is capable of other embodiments or of being practiced or carried out in various ways. Also, it is to be understood that the phraseology and terminology employed herein are for the purpose of description and should not be regarded as limiting.

Steps, components, operation, and implementation of the method, device, and system for generating dynamically controllable oscillatory fluid flow, according to the present invention are better understood with reference to the drawings and the accompanying description.

The method and device for generating dynamically controllable oscillatory fluid flow at a variable frequency, amplitude, wave form and mean flow rate are herein described.

Figure 1:
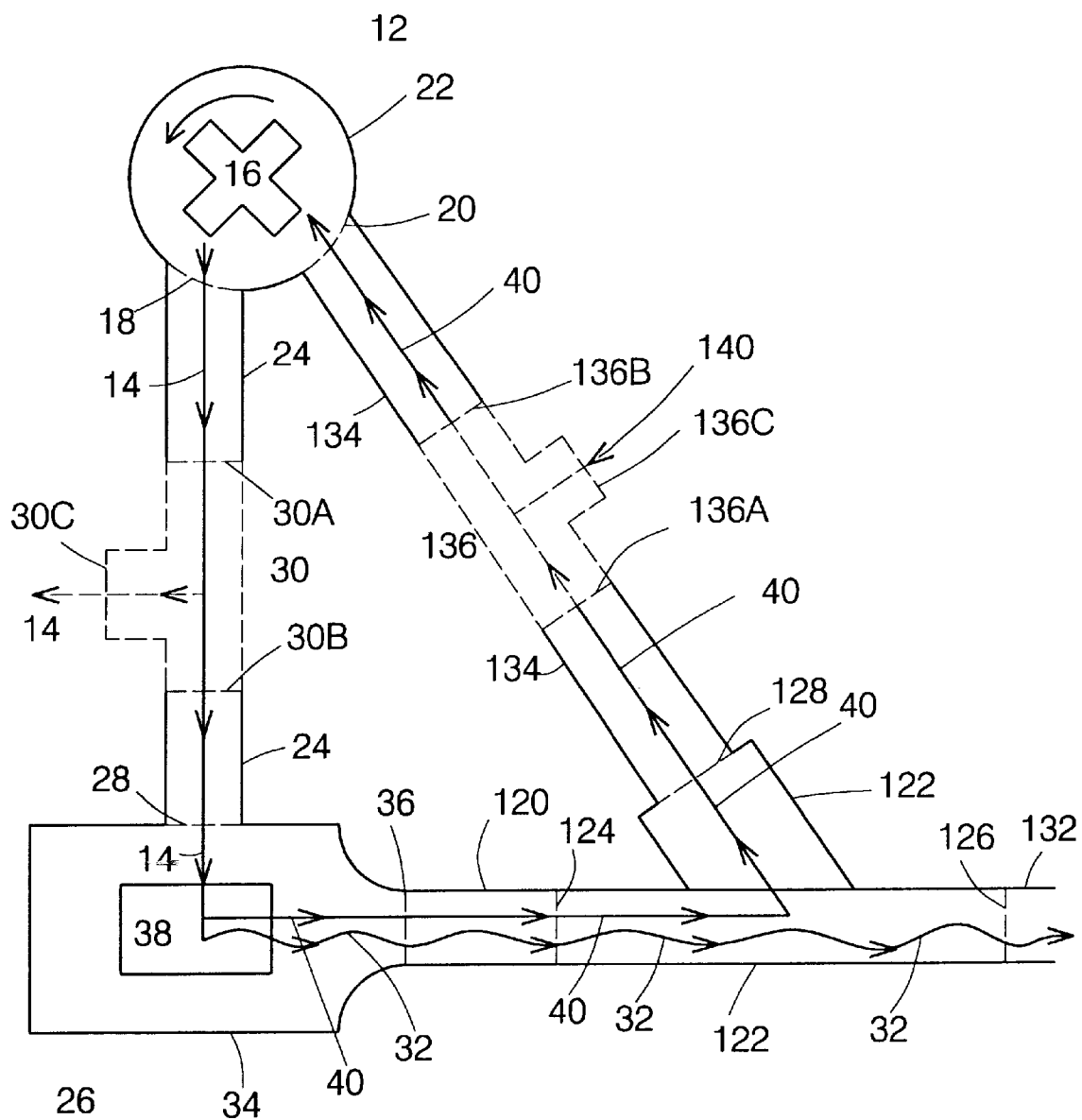
FIG. 1 is a schematic diagram illustrating a preferred embodiment of the device for generating dynamically controllable oscillatory fluid flow, in accordance with the present invention.

In Step 1 of the method, there is provided a device including a driver, a chopper, a flow guide, and connectors between these components. In alternative embodiments of the device, optionally, one or two, three-way valves are included as components of the device. Referring now to the drawings, FIG. 1 is a schematic diagram illustrating a preferred embodiment of the device of the present invention, generally designated as device 10. Optional three-way valves are indicated by dashed lines.

In device 10, a driver 12 for driving a circulatory fluid flow 14, at a controllable constant flow rate, along a circuitous flow path circulating through device 10, generally features a driver mechanism 16, a driver outlet port 18, and a driver inlet port 20, and a driver housing 22. Flow rate and amplitude of constant circulatory fluid flow 14 along the circuitous flow path are controllable according to the power level of driver mechanism 16. Driver 12 may be a bellows or a blower, for driving a gas, such as air, at low to moderate pressures, a compressor for driving air, such as air, at high pressures, a pump for driving a liquid or a liquid/gas mixture, or any other element capable of driving a fluid along circuitous flow path through device 10 at a controllable pressure, amplitude, and flow rate. Driver outlet port 18 is connected, via a connector 24, without an optional three-way valve in-line, to a chopper 26 at a chopper inlet port 28. In alternative embodiments of device 10, a three-way valve 30, for controlling the flow rate and amplitude of constant circulatory fluid flow 14, is positioned in-line along the circuitous flow path between driver outlet port 18 and chopper inlet port 28.

Chopper 26, or any similarly functioning device capable of periodically or aperiodically chopping or interrupting fluid flow, is used for generating a dynamically controllable component of periodic or aperiodic oscillatory fluid flow 32 from constant circulatory fluid flow 14, within a controllable frequency range, amplitude range, wave form range, and mean flow rate range, along a directed or guided flow path of device 10. Chopper 26 generally features a chopper housing 34, a chopper inlet port 28, a chopper outlet port 36, and a chopper mechanism 38 (described and illustrated in FIGS. 2–5). In general, chopper mechanism 38 features at least one movable element activated by a motor, which in turn is activated by a power source (not shown). Chopper mechanism 38 can be a single self-contained unit, or include several units. For example, chopper mechanism 38 can feature a single combined movable element/motor/power source unit, or can feature separate units of a movable element, a motor, and a power source, operating in a cooperative manner for functioning as a chopper. The motor for activating the at least one movable element can be any type, such as electrical, magnetic, electromagnetic such as piezoelectric, mechanical, or electromechanical.

Oscillation parameters of the generated component of periodic or aperiodic oscillatory fluid flow 32 are controllable by varying operation, structure, and/or configuration of chopper components. Once oscillations are generated by chopper 26, the fluid flow is characterized as a superposition of two components, whereby, the first component is chopper generated oscillatory fluid flow 32, and the second component is remaining constant circulator fluid flow 40. Accordingly, the fluid flow exits chopper 26 via chopper outlet port 36 as a superposed fluid flow.

In device 10, different exemplary choppers, distinguishable primarily by operating with a different chopper mechanism 38, may be used for generating the dynamically controllable component of periodic or aperiodic oscillatory fluid flow 32. These include, but not limited to, a disk valve chopper, a T valve chopper, a butterfly chopper, and a reed valve chopper, which are now described and illustrated in FIGS. 2–5.

Figure 2:
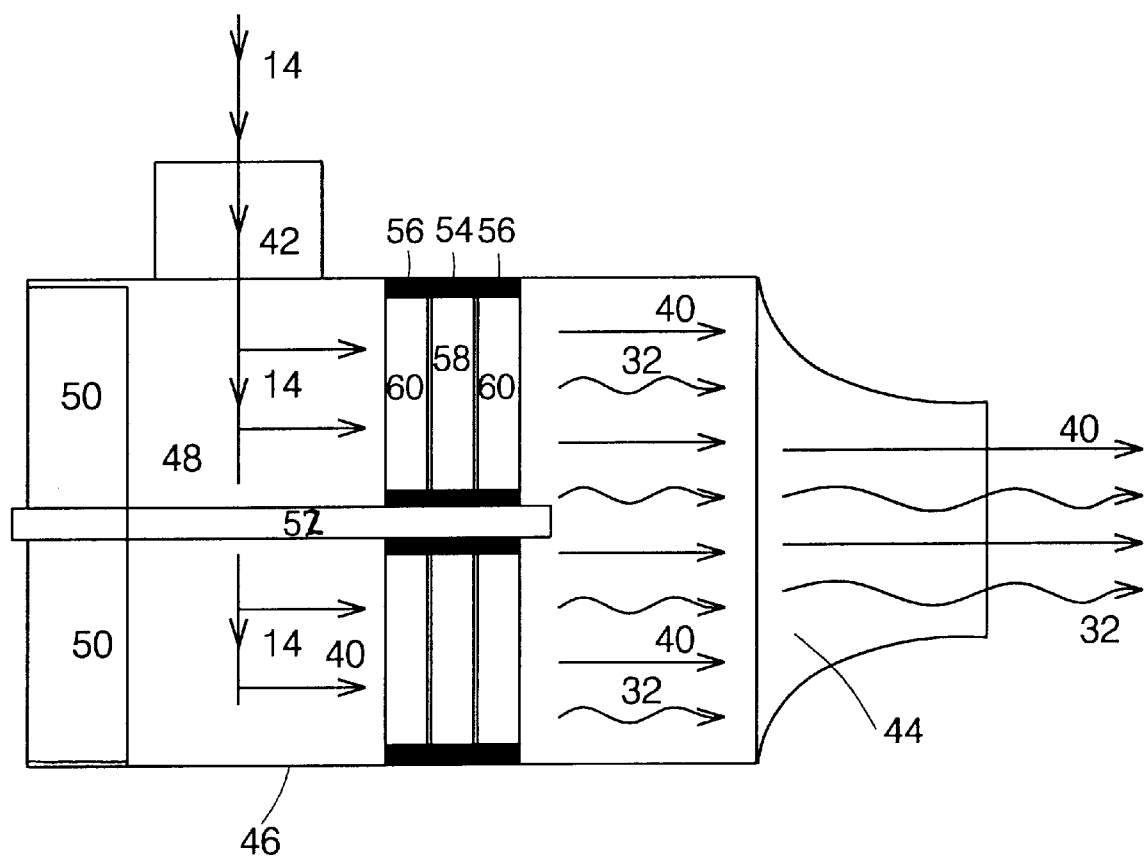
FIG. 2 is a schematic diagram illustrating a disk valve chopper, as the first exemplary chopper which can be used in the preferred embodiment of the device of the present invention.

FIG. 2 is a schematic diagram illustrating a disk valve chopper 42, as the first exemplary chopper which can be used in the preferred embodiment of the device 10 of the present invention. Disk valve chopper 42 features a disk valve chopper inlet port 43, a disk valve chopper outlet port 44, a disk valve chopper housing 46, and a chopper mechanism 48, which includes a motor 50, a shaft 52, at least one rotatable slotted disk 54, and at least one static slotted disk 56. Disk valve chopper 42 is operative by rotatable slotted disk 54 rotating against static slotted disk 56. Oscillation parameters of generated component of periodic or aperiodic oscillatory fluid flow 32 are controllable by varying operation, structure, and/or configuration of the components of disk valve chopper 42.

In particular, oscillation frequency is controllable by varying the rate of rotation of rotatable slotted disk 54 via rotation rate or rpm of shaft 52, which in turn is controllable according to the power level of motor 50. Oscillation frequency is also controllable by varying the number of slots 58 on rotatable slotted disk 54 and/or the number of slots (not shown) 60 on static slotted disk 56. Extent of periodicity or aperiodicity of oscillatory fluid flow 32 is controllable by varying the distance (not shown) between slots 58 on rotatable slotted disk 54 and/or the distance (not shown) between slots 60 on static slotted disk 56. Wave form of oscillatory fluid flow 32 is controllable by varying the shape or configuration of slots 58 on rotatable slotted disk 54 and/or the shape or configuration of slots 60 on static slotted disk 56.

Figure 3:
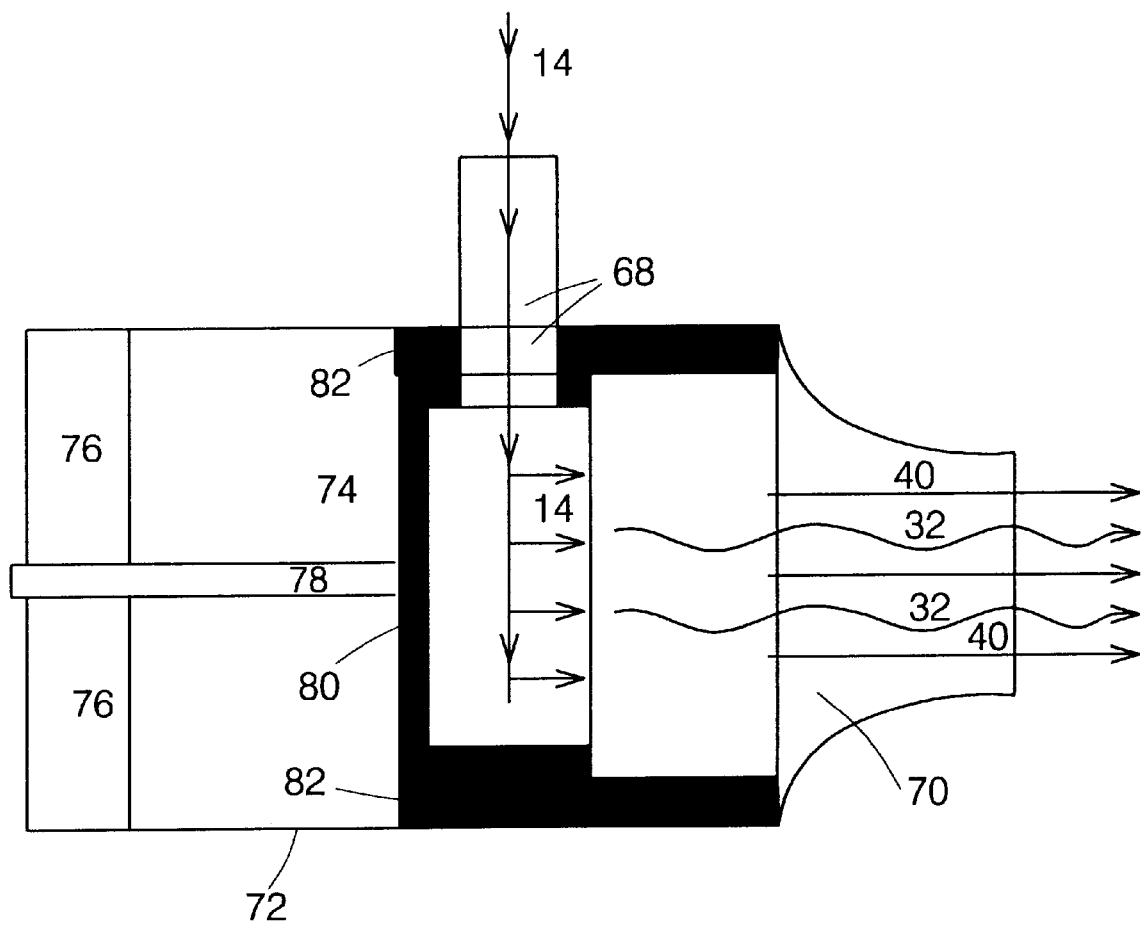
FIG. 3 is a schematic diagram illustrating a T valve chopper, as the second exemplary chopper which can be used in the preferred embodiment of the device of the present invention.

FIG. 3 is a schematic diagram illustrating a T valve chopper, as the second exemplary chopper which can be used in the preferred embodiment of the device 10 of the present invention. T valve chopper 66 features a T valve chopper inlet port 68, a T valve chopper outlet port 70, a T valve chopper housing 72, and a chopper mechanism 74, which includes a motor 76, a shaft 78, a rotatable slotted cylinder 80, and a static slotted cylinder 82. T valve chopper 66 is operative by rotatable slotted cylinder 80 rotating against static slotted cylinder 82. Oscillation parameters of generated component of periodic or aperiodic oscillatory fluid flow 32 are controllable by varying the operation, structure, and/or configuration of the components of T valve chopper 66.

In particular, oscillation frequency is controllable by varying the rate of rotation of rotatable slotted cylinder 80 via rotation rate or rpm of shaft 78, which in turn is controllable according to the power level of motor 76. Oscillation frequency is also controllable by varying the number of slots (not shown) on rotatable slotted cylinder 80 and/or the number of slots (not shown) on static slotted cylinder 82. Extent of periodicity or aperiodicity of oscillatory fluid flow 32 is controllable by varying the distance (not shown) between the slots on rotatable slotted cylinder 80 and/or the distance (not shown) between the slots on static slotted cylinder 82. Wave form of oscillatory fluid flow 32 is controllable by varying the shape or configuration of the slots on rotatable slotted cylinder 80 and/or the shape or configuration of the slots on static slotted cylinder 82.

Figure 4:
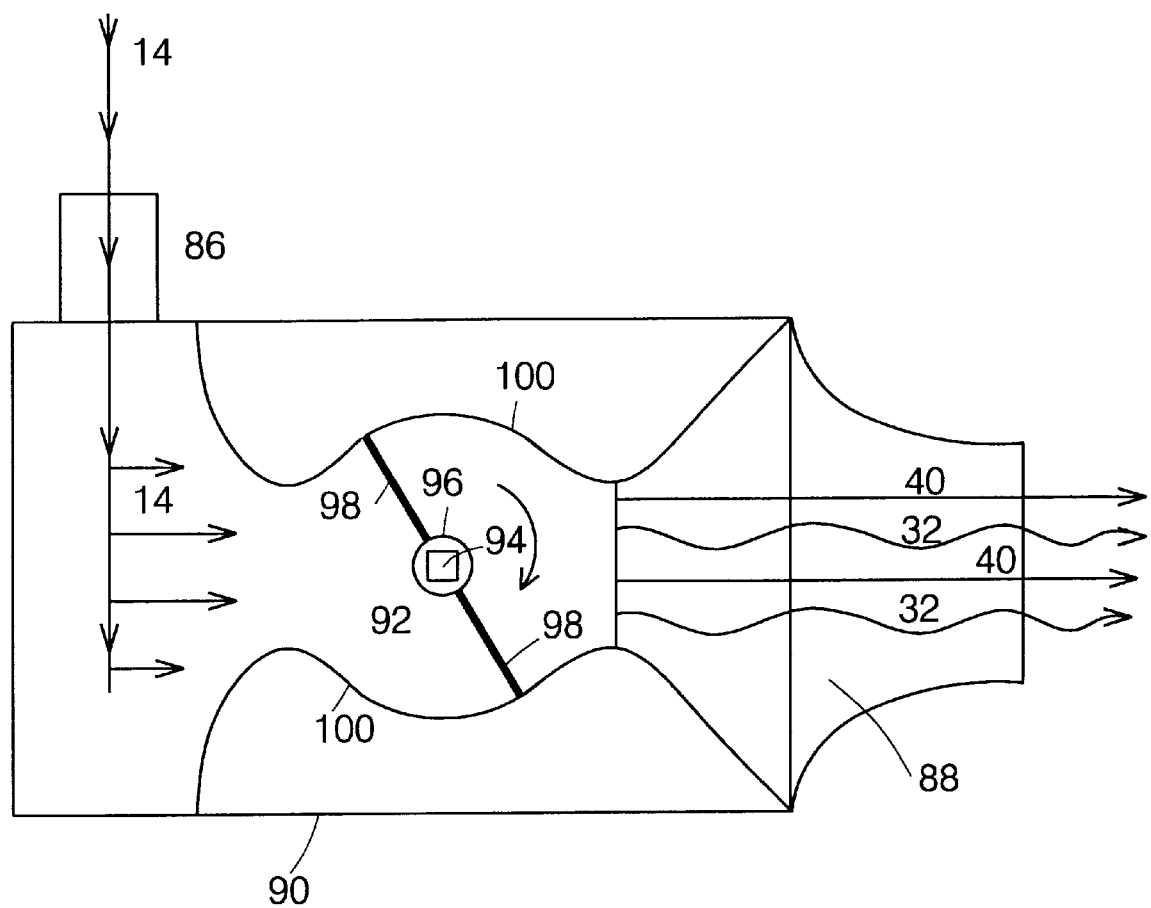
FIG. 4 is a schematic diagram illustrating a butterfly disk chopper, as the third exemplary chopper which can be used in the preferred embodiment of the device of the present invention.

FIG. 4 is a schematic diagram illustrating a butterfly disk chopper, as the third exemplary chopper which can be used in the preferred embodiment of the device 10 of the present invention. Butterfly valve chopper 84 features a butterfly valve chopper inlet port 86, a butterfly valve chopper outlet port 88, a butterfly valve chopper housing 90, and a chopper mechanism 92, which includes a motor 94 housed in a circular shaped motor housing 96, at least one rotatable disk 98 attached to motor housing 96, and a butterfly shaped channel 100. Butterfly valve chopper 84 is operative by at least one rotatable disk 98 rotating within butterfly shaped channel 100. Oscillation parameters of generated component of periodic or aperiodic oscillatory fluid flow 32 are controllable by varying the operation, structure, and/or configuration of the components of butterfly valve chopper 84.

In particular, oscillation frequency is controllable by varying the rate of rotation of rotatable disks 98 via rotation rate of rpm of rotor housing 96, which in turn is controllable according to the power level of motor 94. Oscillation frequency is also controllable by varying the number of rotatable disks 98 attached to motor housing 96. Extent of periodicity or aperiodicity of oscillatory fluid flow 32 is controllable by varying the distance (not shown) between rotatable disks 98. Wave form of oscillatory fluid flow 32 is controllable by varying the shape or configuration of rotatable disks 98 attached to motor housing 96, and/or by varying the shape or configuration of butterfly shaped channel 100.

Figure 5:
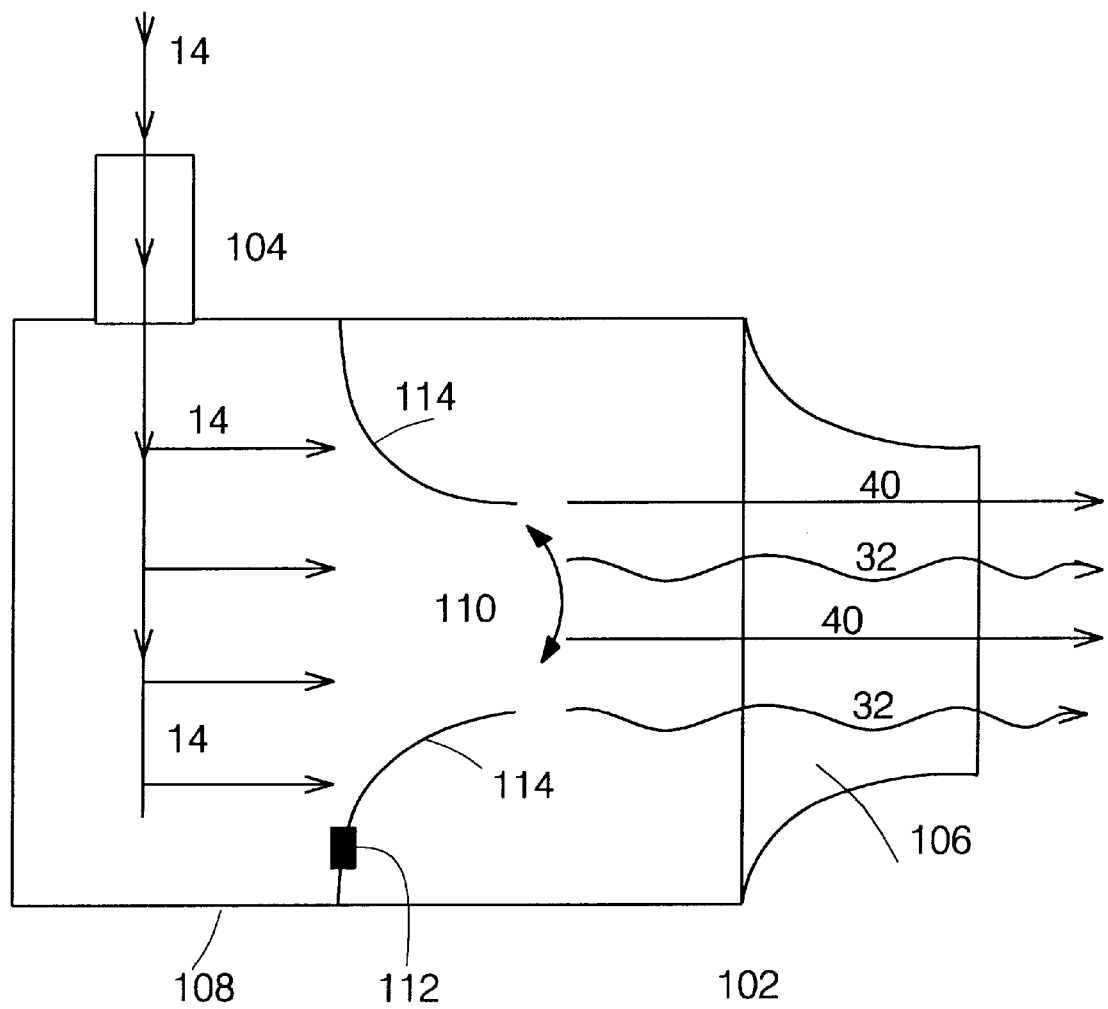
FIG. 5 is a schematic diagram illustrating a reed valve chopper, as the fourth exemplary chopper which can be used in the preferred embodiment of the device of the present invention.

FIG. 5 is a schematic diagram illustrating a reed valve chopper, as the fourth exemplary chopper which can be used in the preferred embodiment of the device 10 of the present invention. Reed valve chopper 102 features a reed valve chopper inlet port 104, a reed valve chopper outlet port 106, a reed valve chopper housing 108, and a chopper mechanism 110, which includes a motor 112 internally or externally located with respect to reed valve chopper housing 108 and in communication with at least one, preferably two, reeds 114, attached to reed valve housing 106. Reed valve chopper 102 is operative by reeds 114 oscillating in response to an input signal, such as an electrical signal, provided by motor 112. Oscillation parameters of generated component of periodic or aperiodic oscillatory fluid flow 32, including frequency, amplitude, and wave form, are controllable by varying the number, structure and/or configuration of reeds 114, and/or by varying the rate of oscillation of reeds 114 according to the type and/or magnitude of electrical input signal provided by motor 112.

Referring again to FIG. 1, in device 10, chopper outlet port 36 is connected, via a connector 120, to a flow guide 122 at flow guide inlet port 124. Flow guide 122 features three ports, a flow guide input port 124, a flow guide outlet port 126, and a flow guide return port 128. Preferred configuration of flow guide 122 is a bifurcation, or any similarly bifurcated element or structure, functioning to guide and bifurcate or divide incoming fluid flow featuring a superposition of the two fluid flow components, first component of chopper generated oscillatory fluid flow 32, and second component of remaining constant circulatory fluid flow 40.

First fluid flow component of chopper generated oscillatory fluid flow 32 passes through flow guide 122 and exits flow guide outlet port 126 via connector 132, thereby enabling exit from device 10 for input into another device or system (not shown) utilizing oscillatory fluid flow 32, according to a particular application.

Second fluid flow component is remaining constant circulatory fluid flow 40 returning or circulating back through flow guide return port 128 to driver inlet port 20 of driver 12, via connector 134, without an optional three-way valve 136 in-line, thereby, enabling continued generation of the oscillatory fluid flow. In alternative embodiments of device 10, at least one three-way valve 136, for controlling the mean flow rate of oscillatory fluid flow 32, is positioned in-line along the circuitous flow path between flow guide return port 128 and driver inlet port 20.

In Step 2 of the method, referring to FIG. 1, and using device 10 of Step 1, there is activating driver 12 via driver mechanism 16 for initiating constant circulatory fluid flow 14 along the circuitous flow path, including simultaneously driving constant circulatory fluid flow out of driver 12 through driver outlet 18 and into driver 12 through driver inlet 20. Constant circulatory flow 14 exiting driver outlet 18 flows through connector 24, used for containing and directing the fluid flow along the circuiutous flow path, and into chopper inlet port 28. The flow rate and amplitude of constant circulatory fluid flow 14 along the circuitous flow path are controllable according to the power level of driver mechanism 16.

In Step 3, there is activation of chopper 26 for generating a component of oscillatory fluid flow 32 from constant circulatory fluid flow 14. Accordingly, a superposition of two components of fluid flow exits chopper 26 via chopper outlet port 36. The first component is generated oscillatory fluid flow 32, and the second component is remaining constant circulator fluid flow 40. Oscillation parameters, including perdiodicity or aperiodicity, frequency, amplitude, wave form, and mean flow rate, of first component oscillatory fluid flow 32 are controllable by varying the operation, structure and/or configuration of the components of chopper 26, as illustrated in FIGS. 2–6 and described in Step 1.

In Step 4, there is guiding the superposed fluid flow, featuring both first component of oscillatory fluid flow 32, and second component of remaining circulatory fluid flow 40, to flow guide 122 via connector 120, where flow guide 122 can be, for example, a bifurcation element as described in Step 1. Inside flow guide 122, the superposed fluid flow is bifurcated or divided into two components. The first component is oscillatory fluid flow 32 exiting through flow guide outlet port 126 via connector 132, and the second component is remaining constant circulatory fluid flow 40 circulating or returning back to driver 12 through flow guide return port 128 via connector 134, without optional three-way valve 136 in-line, enabling continued generation of the oscillatory fluid flow.

A significant novelty of the present invention is that it can be used for generating dynamically controllable oscillatory fluid flow having a zero mean flow rate, and oscillation parameters of high frequency, up to about 1 kHz, high amplitude, and variable wave form. It turns out, as a result of the unique configuration and combined operation of the components of device 10, a zero mean flow rate of oscillatory fluid flow 32 can be produced, and maintained through connector 132 leaving flow guide outlet port 126, by including no three-way valve, or, by including at least one three-way valve, in-line in the circuitous flow path. Moreover, alternative embodiments of device 10, according to including one or two three-way valves, and according to particular valve configurations, such as by closing or opening one or both of the three-way valves, enable production and control of zero or negative (suction) mean flow rate of oscillatory fluid flow 32, or, zero or positive mean flow rate of oscillatory fluid flow 32. The basis of enabling production and maintenance of zero mean oscillatory fluid flow rate is that during operation of device 10 under conditions where there is no source for increasing, nor sink for decreasing, the circulating fluid flow rate, such as by including no valve in the circuitous flow path, or by closing any valve alternately included in the circuitous flow path, it follows that fluid flow rate exiting driver 12 at driver outlet port 18 equals fluid flow rate entering driver 12 at driver inlet port 20, whereby, zero mean flow rate of oscillatory fluid flow can be achieved for exiting device 10 via flow guide exit port 26 through connector 132.

As already described, optional three-way valve 30 and/or 136, shown as dashed lines in FIG. 1, can be included in-line in the circuitous flow path of device 10, for dynamically controlling the mean oscillatory fluid flow rate. In a first alternative embodiment of device 10, a single three-way valve 30 is positioned in-line along high pressure part of the circuitous flow path between driver outlet port 18 and chopper inlet port 28, for producing and controlling a zero or negative mean flow rate of oscillatory fluid flow 32. In a first configuration, when three-way valve 30 is in a closed position whereby valve ports 30A and 30B are open to constant circulatory fluid flow 14, and valve port 30C is closed to fluid flow exiting device 10, the mean flow rate of oscillatory fluid flow 32 is zero. Alternatively, in a second configuration, when three-way valve 30 is in an open position whereby valve ports 30A and 30B are open to constant circulatory fluid flow 14, and valve port 30C is open to allow constant circulatory fluid flow 14 to exit device 10, forming a condition of flow loss or suction along the circuitous flow path, the mean flow rate of oscillatory fluid flow 32 is negative.

In a second alternative embodiment of device 10, a single three-way valve 136 is positioned in-line along low pressure part of the circuitous flow path, between flow guide return port 128 and driver inlet port 20, for producing and controlling a zero or positive mean flow rate of oscillatory fluid flow 32. In a first configuration, when three-way valve 136 is in a closed position whereby valve ports 136A and 136B are open to remaining constant circulatory fluid flow 40, and valve port 136C is closed to fluid flow entering device 10, the mean flow rate of oscillatory fluid flow 32 is zero. Alternately, in a second configuration, when three-way valve 136 is in an open position whereby valve ports 136A and 136B are open to remaining constant circulatory fluid flow 40, and valve port 136C is open to allow external fluid flow 140 to enter device 10, forming a condition of flow gain or intake along the circuitous flow path, the mean flow rate of oscillatory fluid flow 32 is positive.

In a third alternative embodiment of device 10, both first three-way valve 30 and second three-way valve 136, are positioned in-line along high pressure and low pressure parts of the circuitous flow path, respectively, between the corresponding components, for producing and controlling a zero, a negative, or a positive mean flow rate of oscillatory fluid flow 32, according to proper configuration of three-way valves 30 and 136.

In a first configuration of this embodiment, when both first three-way valve 30 and second three-way valve 136 are each in a closed position, whereby valve ports 30A and 30B of first three-way valve 30, and valve ports 136A and 136B of second three-way valve 136, are open to constant circulatory fluid flow 14, and to remaining constant circulatory fluid flow 40, respectively, and valve port 30C of first three-way valve 30, and valve port 136C of second three-way valve 136, are closed to fluid flow exiting or entering device 10, respectively, the mean flow rate of oscillatory fluid flow 32 is zero.

In a second configuration of this embodiment, when first three-way valve 30 is in an open position, and second three-way valve 136 is in a closed position, whereby valve ports 30A and 30B of first three-way valve 30 are open to constant circulatory fluid flow 14, and valve port 30C is open to allow constant circulatory fluid flow 14 to exit device 10, and whereby valve ports 136A and 136B of second three-way valve 136 are open to remaining constant circulatory fluid flow 40, and valve port 136C is closed to external fluid flow 140 entering device 10, the mean flow rate of oscillatory fluid flow 32 is negative as a result of open valve port 30C of first three-way valve 30.

In a third configuration of this embodiment, when first three-way valve 30 is in a closed position, and second three-way valve 136 is in an open position, whereby valve ports 30A and 30B of first three-way valve 30 are open to constant circulatory fluid flow 14, and valve port 30C is closed to constant circulatory fluid flow 14 exiting device 10, and whereby valve ports 136A and 136B of second three-way valve 136 are open to remaining constant circulatory fluid flow 40, and valve port 136C is open to external fluid flow 140 entering device 10, the mean flow rate of oscillatory fluid flow 32 is positive as a result of open valve port 136C of second three-way valve 136.

An alternative, related method, and corresponding preferred embodiment of a device, for generating dynamically controllable oscillatory fluid flow at a variable frequency, amplitude, wave form ad mean flow rate are herein described. This method and corresponding device feature a combined driver/chopper unit instead of a separate driver and a separate chopper.

Figure 6:
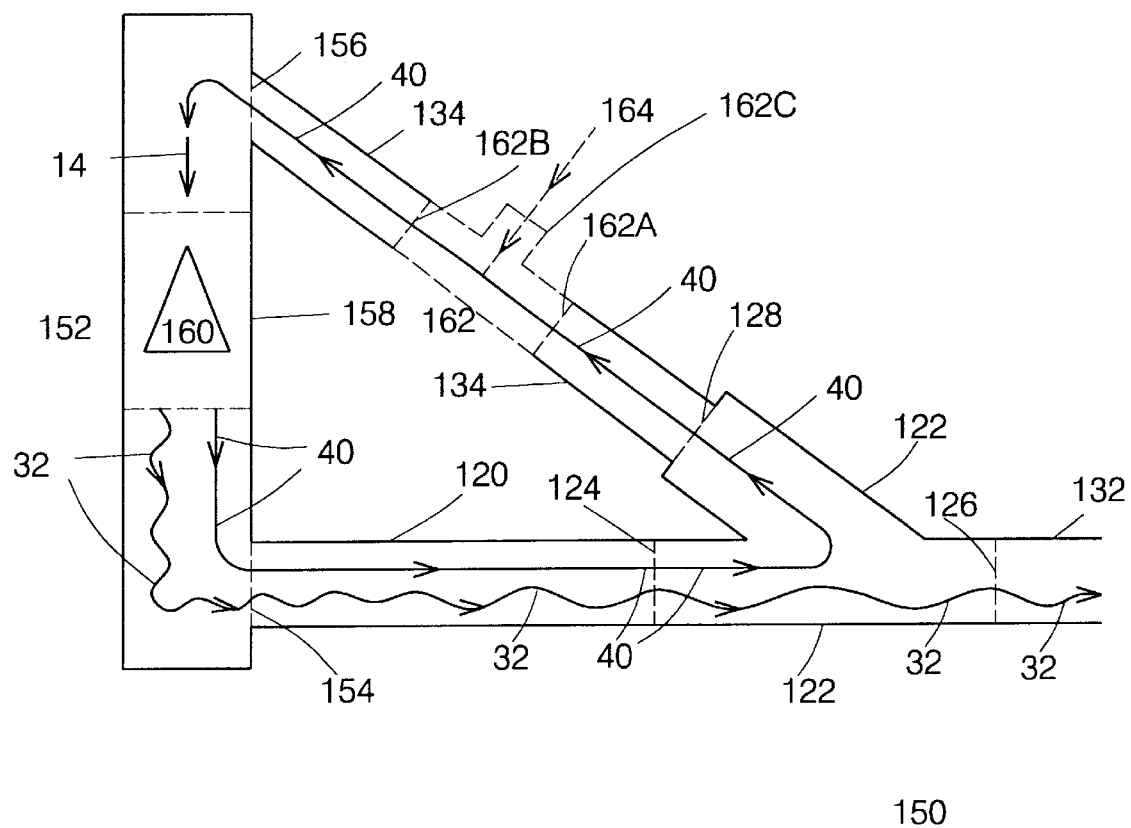
FIG. 6 is a schematic diagram illustrating another preferred embodiment of the device for generating dynamically controllable oscillatory fluid flow, in accordance with the present invention.

In Step 1 of the method, there is provided a device including a driver/chopper unit, a flow guide, and connectors between these components. FIG. 6 is a schematic diagram illustrating another preferred embodiment of the device of the present invention, generally designated as device 150. An alternative embodiment of device 150 includes an optional three-way valve, indicated by dashed lines, as a component of device 150.

In device 150, a combined driver/chopper unit 152 for simultaneously driving and, periodically or aperiodically chopping or interrupting fluid flow, is used for generating a dynamically controllable component of periodic or aperiodic oscillatory fluid flow 32 from constant circulatory fluid flow 14, within a controllable frequency range, amplitude range, wave form range, and mean flow rate range, along a circuitous flow path of device 150.

Driver/chopper unit 152 generally features a driver/chopper outlet port 154, a driver/chopper inlet port 156, a driver/chopper housing 158, and a driver/chopper mechanism 160. In general, driver/chopper mechanism 160 features at least one movable element (not shown) activated by a motor (not shown), which in turn is activated by a power source (not shown). Driver/chopper mechanism 160 can be a single self-contained mechanism, or include multiple mechanisms required for simulataneously driving and chopping constant circulatory fluid flow 14 and oscillatory fluid flow 32. For example, driver/chopper mechanism 160 can feature a single combined movable element/motor/power source mechanism, or can feature separate mechanisms of a movable element, a motor, and a power source, operating in a cooperative manner for functioning as a combined driver/chopper unit. The motor for activating the at least one movable element can be any type, such as electrical, magnetic, electromagnetic such as piezoelectric, mechanical, or electromechanical.

Flow rate and amplitude of constant circulatory fluid flow 14 along the circuitous flow path are controllable according to the power level of driver/chopper mechanism 160. Oscillation parameters of the generated component of periodic are aperiodic oscillatory fluid flow 32, including frequency, amplitude, and wave form, are controllable by varying operation, number, structure, and/or configuration of driver/chopper components. Once oscillations are generated by driver/chopper unit 152, the fluid flow is characterized as a superposition of two components, whereby, the first component is generated oscillatory fluid flow 32, and the second component is remaining constant circulatory fluid flow 40. Accordingly, the fluid flow exits a driver/chopper unit 152 via driver/chopper outlet 154 as a superposed fluid flow.

Referring again to FIG. 6, in device 150, driver/chopper outlet port 154 is connected, via a connector 120, to flow guide 122 at flow guide outlet port 124. Flow guide 122 is structurally and operationally the same as previously described in the above method with reference to FIG. 1, featuring flow guide inlet port 124, flow guide outlet port 126, and flow guide return port 128, and functioning to guide and bifurcate or divide incoming fluid flow featuring a superposition of the two fluid flow components, first component of driver/chopper generated oscillatory fluid flow 32, and second component of remaining constant circulatory fluid flow 40.

First fluid flow component of driver/chopper generated oscillatory fluid flow 32 passes through flow guide 122 and exits flow guide outlet port 126 via connector 132, thereby enabling exit from device 150 for input into another device or system (not shown) utilizing oscillatory fluid flow 32, according to a particular application. Second fluid flow component is remaining constant circulatory fluid flow 40 returning or circulating back through flow guide return port 128 to driver/chopper inlet port 156 of driver/chopper unit 152, via connector 134, without optional three-way valve 162 in-line, thereby, enabling continued generation of the oscillatory fluid flow. In an alternative embodiment of device 150, at least one three-way valve 162, for controlling the mean flow rate of oscillatory fluid flow 32, is positioned in-line along the circuitous flow path between flow guide return port 128 and driver/chopper inlet port 156.

In Step 2 of the method, referring to FIG. 6, and using device 150 of Step 1, there is activating driver/chopper unit 152 via driver/chopper mechanism 160 for simultaneously iniating constant circulatory fluid flow 14 and generating a component of oscillatory fluid flow 32 from constant circulatory fluid flow 14, along the circuitous flow path, including simultaneously driving and chopping constant circulatory fluid flow out of driver/chopper unit 152 through driver/chopper outlet 154 and into driver/chopper unit 152 through driver/chopper inlet 156. Superposed constant circulatory fluid 40 and oscillatory fluid flow 32 exiting driver/chopper outlet 154 flow through connector 120, used for containing and directing the fluid flow along the circuitous flow path.

Flow rate and amplitude of constant circulatory fluid flow 14 along the circuitous flow path are controllable according to the power level of driver/chopper mechanism 160. Oscillation parameters, including periodicity or aperiodicity, frequency, amplitude, wave form, and mean flow rate, of first component oscillatory fluid flow 32 are controllable by varying the operation, structure, and/or configuration of the components of driver/chopper unit 152, as described in Step 1.

In Step 3, there is guiding the superposed fluid flow, featuring both first component of oscillatory fluid flow 32, and second component of remaining circulatory fluid flow 40, to flow guide 122. Inside flow guide 122, the superposed fluid flow is bifurcated or divided into two components. The first component is oscillatory fluid flow 32 exiting through flow guide outlet port 126 via connector 132, and the second component is remaining constant circulatory fluid flow 40 circulating or returning back to driver/chopper unit 152 through flow guide return port 128 via connector 134, without optional three-way valve 162 in-line, enabling continued generation of the oscillatory fluid flow.

As previously described, at least one optional three-way valve 162, shown as dashed lines in FIG. 6, can be included in-line in the circuitous flow path of device 150, for dynamically controlling the mean oscillatory fluid flow rate, including achieving zero mean oscillatory flow rate.

In an alternative embodiment of device 150, a single three-way valve 162 is positioned in-line along low pressure part of the circuitous flow path, between flow guide return port 128 and driver/chopper inlet port 156, for producing and controlling a zero or positive flow rate of oscillatory fluid flow 32. In a first configuration, when three-way valve 162 is in a closed position whereby valve ports 162A and 162B are open to remaining constant circulatory fluid flow 40, and valve port 162C is closed to fluid flow entering device 150, the mean flow rate of oscillatory fluid flow 32 is zero. Alternatively, in a second configuration, when three-way valve 162 is in an open position whereby valve ports 162A and 162B are open to remaining constant circulatory fluid flow 40, and valve port 162C is open to allow external fluid flow 164 to enter device 150, forming a condition of flow gain or intake along the circuitous flow path, the mean flow rate of oscillatory fluid flow 32 is positive.

The system for implementing preferred methods and operating preferred embodiments of the device, in accordance with the present invention, for generating dynamically controllable oscillatory fluid flow at a controlled frequency, amplitude, wave form and mean flow rate is herein described.

The system features (a) a device for generating dynamically controllable oscillatory fluid flow at a controlled frequency, amplitude, wave form and mean flow rate, (b) at least one controller for activating and controlling components of the device in response to input commands, values, data, and/or signals, (c) a central processing unit (CPU) for (i) receiving, storing, and processing the input information such as commands, values, data, and/or signals, and, (ii) for sending the received, stored, and processed input information such as commands, values, data, and/or signals to the at least one controller, and (d) a plurality of control/data links for effecting electronic communication between the CPU and the at least one controller, and between the at least one controller and components of the device.

The system of the present invention is applicable to device 10, to device 150, and to each alternative embodiment of each device 10, and device 150, as previously described and illustrated in FIGS. 1 and 6, respectively. For example, with respect to device 10 of FIG. 1, the at least one controller activates and controls driver 12, chopper 26, flow guide 122, connectors 24, 120, 132, and 134, and optional three-way valves 30 and 136, or, with respect to device 150 of FIG. 6, the controller activates and controls driver/chopper 152, flow guide 122, connectors 24, 120, 132, and 134, ad optional three-way valve 162, in response to input commands, values, and/or signals received, stored, processed, and sent by the CPU, via the plurality of control/data links, in order to enable generating dynamically controllable oscillatory fluid flow at a controlled frequency, amplitude, weave form and mean flow rate.

While the invention has been described in conjunction with specific embodiments thereof, it is evident that may alternatives, modifications and variations will be apparent to those skilled in the art. Accordingly, it is intended to embrace all such alternatives, modifications, and variations that fall within the spirit and broad scope of the appended claims.

What is claimed is:

1. A method for generating dynamically controllable oscillatory fluid flow featuring oscillation parameters of variable frequency, variable amplitude, variable wave form, and variable mean flow rate, comprising the steps of:
    (a) driving a constant circulatory fluid flow along a circuitous flow path by using a driver;
    (b) chopping said constant circulatory fluid flow by using a chopper, thereby generating the dynamically controllable oscillatory fluid flow from said constant circulatory fluid flow, such that said fluid flow becomes a superposition of two fluid flow components, first component is the dynamically controllable oscillatory fluid flow, second component is remaining said constant circulatory fluid flow;
    (c) guiding said superposition of said two fluid flow components and dividing said superposition of said two fluid flow components into said first component of the dynamically controllable oscillatory fluid flow and into said second component of said remaining constant circulatory fluid flow; and
    (d) guiding said first component of the dynamically controllable oscillatory fluid flow to exit said circuitous flow path and said second component of said remaining constant circulatory fluid flow to return to said driver.

2. The method of claim 1, wherein the step of driving said constant circulatory fluid flow includes controlling flow rate and amplitude of said constant circulatory fluid flow according to power level of said driver.

3. The method of claim 1, wherein said driver is selected from the group consisting of a bellows, a blower, a compressor, and a pump.

4. The method of claim 1, wherein the step of chopping said constant circulatory fluid flow is effected in a mode selected from the group consisting of a periodic mode and an aperiodic mode, such that corresponding oscillations of the dynamically controllable oscillatory fluid flow are selected from the group consisting of periodic oscillations and aperiodic oscillations.

5. The method of claim 1, wherein the oscillation parameters of variable frequency, variable amplitude, variable wave form, and variable mean flow rate of the dynamically controllable oscillatory fluid flow are controllable by varying a chopper parameter selected from the group consisting of chopper operation, chopper structure, and chopper configuration.

6. The method of claim 1, wherein said chopper is selected from the group consisting of a disk valve chopper, a T valve chopper, a butterfly chopper, and a reed valve chopper.

7. The method of claim 1, wherein the step of guiding said superposition of said two fluid flow components and dividing said superposition of said two fluid flow components into said first component of the dynamically controllable oscillatory fluid flow and into said second component of said remaining constant circulatory fluid flow is effected by a flow guide, said flow guide includes a bifurcation.

8. The method of claim 1, wherein flow rate and amplitude of said constant circulatory fluid flow, said first component of the dynamically controllable oscillatory fluid flow, and said second component of said remaining constant circulatory fluid flow are controllable by using at least one three-way valve positioned in-line along said circuitous flow path.

9. A method for generating dynamically controllable oscillatory fluid flow featuring oscillation parameters of variable frequency, variable amplitude, variable wave form, and variable mean flow rate, comprising the steps of:
    (a) simultaneously driving and chopping a constant circulatory fluid flow along a circuitous flow path by using a driver/chopper unit, thereby generating the dynamically controllable oscillatory fluid flow from said constant circulatory fluid flow, such that said fluid flow becomes a superposition of two fluid flow components, first component is the dynamically controllable oscillatory fluid flow, second component is remaining said constant circulatory fluid flow;
    (b) guiding said superposition of said two fluid flow components and dividing said superposition of said two fluid flow components into said first component of the dynamically controllable oscillatory fluid flow and into said second component of said remaining constant circulatory fluid flow; and
    (c) guiding said first component of the dynamically controllable oscillatory fluid flow to exit said circuitous flow path and said second component of said remaining constant circulatory fluid flow to return to said driver/chopper unit.

10. The method of claim 9, wherein the step of simultaneously driving and chopping said constant circulatory fluid flow includes controlling flow rate and amplitude of said constant circulatory fluid flow according to power level of said driver/chopper unit.

11. The method of claim 9, whereby said driver/chopper unit includes at least one movable element activated by a motor, type of motor for activating said at least one movable element is selected from the group consisting of electrical, magnetic, electromagnetic, mechanical, and electromechanical, said electromagnetic motor includes a piezoelectric mechanism.

12. The method of claim 9, wherein the step of simultaneously driving and chopping said constant circulatory fluid flow is effected in a mode selected from the group consisting of a periodic mode and an aperiodic mode, such that corresponding oscillations of the dynamically controllable oscillatory fluid flow are selected from the group consisting of periodic oscillations and aperiodic oscillations.

13. The method of claim 9, wherein the oscillation parameters of variable frequency, variable amplitude, variable wave form, and variable mean flow rate of the dynamically controllable oscillatory fluid flow are controllable by varying a driver/chopper unit parameter selected from the group consisting of driver/chopper unit operation, driver/chopper unit structure, and driver/chopper unit configuration.

14. The method of claim 9, wherein the step of guiding said superposition of said two fluid flow components and dividing said superposition of said fluid flow components into said first component of the dynamically controllable oscillatory fluid flow and into said second component of said remaining constant circulatory fluid flow is effected by a flow guide, said flow guide includes a bifurcation.

15. The method of claim 9, wherein flow rate and amplitude of said constant circulatory fluid flow, said first component of the dynamically controllable oscillatory fluid flow, and said second component of said remaining constant circulatory fluid flow are controllable by using at least one three-way valve positioned in-line along said circuitous flow path.

16. A device for generating dynamically controllable oscillatory fluid flow featuring oscillation parameters of variable frequency, variable amplitude, variable wave form, and variable means flow rate, comprising:
  (a) a driver for driving a constant circulatory fluid flow along a circuitous flow path circulating through the device;
  (b) a chopper for chopping said constant circulatory fluid flow, thereby generating the dynamically controllable oscillatory fluid flow from said constant circulatory fluid flow, such that said fluid flow becomes a superposition of two fluid flow components, first component is the dynamically controllable oscillatory fluid flow, second component is remaining said constant circulatory fluid flow;
  (c) a flow guide for guiding said superposition of said two fluid flow components and dividing said superposition of said two fluid flow components into said first component of the dynamically controllable oscillatory fluid flow and into said second component of said remaining constant circulatory fluid flow; and
  (d) a plurality of connectors for guiding said fluid flow, said superposition of said two fluid flow components, and said two components of said fluid flow, including enabling said first component of the dynamically controllable oscillatory fluid flow to exit the device and said second component of said remaining constant circulatory fluid flow to return to said driver.

17. The device of claim 16, whereby said driver controls flow rate and amplitude of said constant circulatory fluid flow according to power level of said driver.

18. The device of claim 16, wherein said driver is selected from the group consisting of a bellows, a blower, a compressor, and a pump.

19. The device of claim 16, wherein said chopper chops said constant circulatory fluid flow in a mode selected from the group consisting of a periodic mode and an aperiodic mode, such that corresponding oscillations of the dynamically controllable oscillatory fluid flow are selected from the group consisting of periodic oscillations and aperiodic oscillations.

20. The device of claim 16, wherein the oscillation parameters of variable frequency, variable amplitude, variable wave form, and variable mean flow rate of the dynamically controllable oscillatory fluid flow are controllable by varying a chopper parameter selected from the group consisting of chopper operation, chopper structure, and chopper configuration.

21. The device of claim 16, wherein said chopper is selected from the group consisting of a disk valve chopper, a T valve chopper, a butterfly chopper, and a reed valve chopper.

22. The device of claim 21, wherein said chopper operates according to a type of mechanism selected from the group consisting of electrical, magnetic, electromagnetic, mechanical, and electromechanical.

23. The device of claim 16, wherein a flow guide includes a bifurcation.

24. The device of claim 16, wherein flow rate and amplitude of said constant circulatory fluid flow, said first component of the dynamically controllable oscillatory fluid flow, and said second component of said remaining constant circulatory fluid flow are controllable by using at least one three-way valve positioned in-line along said circuitous flow path.

25. A device for generating dynamically controllable oscillatory fluid flow featuring oscillation parameters of variable frequency, variable amplitude, variable wave form, and variable mean flow rate, comprising:
  (a) a driver/chopper unit for simultaneously driving and chopping a constant circulatory fluid flow along a circuitous flow path circulating through the device, thereby generating the dynamically controllable osciallatory fluid flow from said constant circulatory fluid flow, such that said fluid flow becomes a superposition of two fluid components, first component is the dynamically controllable oscillatory fluid flow, second component is remaining said constant circulatory fluid flow;
  (b) a flow guide for guiding said superposition of said two fluid flow components and dividing said superposition of said two fluid flow components into said first component of the dynamically controllable osciallatory fluid flow and into said component of said remaining constant circulatory fluid flow; and
  (c) a plurality of connectors for guiding said fluid flow, said superposition of said two fluid flow components, and said two components of said fluid flow, including enabling said first component of the dynamically controllable oscillatory fluid flow to exit the device and said second component of said remaining constant circulatory fluid flow to return to said driver/chopper unit.

26. The device of claim 25, wherein said driver/chopper unit controls flow rate and amplitude of said constant circulatory fluid flow according to power level of said driver/chopper unit.

27. The device of claim 25, wherein said driver/chopper operates according to a type of mechanism selected from the group consisting of electrical, magnetic, electromagnetic, mechanical, and electromechanical.

28. The device of claim 25, wherein said driver/chopper unit chops said constant circulatory fluid flow in a mode selected from the group consisting of a periodic mode and an aperiodic mode, such that corresponding oscillations of the dynamically controllable osciallatory fluid flow are selected from the group consisting of periodic oscillations and aperiodic oscillations.

29. The device of claim 25, wherein the oscillation parameters of variable frequency, variable amplitude, variable wave form, and variable mean flow rate of the dynamically controllable oscillatory fluid flow are controllable by varying a driver/chopper unit parameter selected from the group consisting of driver/chopper unit operation, driver/chopper unit structure, ad driver/chopper unit configuration.

30. The device of claim 25, wherein said flow guide includes a bifurcation.

31. The device of claim 25, wherein flow rate and amplitude of said constant circulatory fluid flow, said first component of the dynamically controllable oscillatory fluid flow, and said second component of said remaining constant circulatory fluid flow are controllable by using at least one three-way valve positioned in-line along said circuitous flow path.

32. A system for generating dynamically controllable oscillatory fluid flow featuring oscillation parameters of variable frequency, variable amplitude, variable wave form, and variable mean flow rate, the system comprising:
(a) a device for generating the dynamically controllable oscillatory fluid flow;
(b) at least one controller for activating and controlling components of said device in response to input information selected from the group consisting of commands, values, data, and signals;
(c) a central processing unit for receiving, storing, and processing said input information and for sending said received, stored, and processed input information to said at least one controller; and
(d) a plurality of control/data links for effecting electronic communication between said central processing unit and said at least one controller, and between said at least one controller and said components of said device.

33. The system of claim 32, wherein said device includes:
(i) a driver for driving a constant circulatory fluid flow along a circuitous flow path circuiting through said driver;
(ii) a chopper for chopping said constant circulatory fluid flow, thereby generating the dynamically controllable osciallatory fluid flow from said constant circulatory fluid flow, such that said fluid flow becomes a superposition of two fluid components, first component is the dynamically controllable oscillatory fluid flow, second component is remaining said constant circulatory fluid flow;
(iii) a flow guide for guiding said superposition of said two fluid flow components and dividing said superposition of said two fluid flow components into said first component of the dynamically controllable oscillatory fluid flow and into said second component of said remaining constant circulatory fluid flow; and
(iv) a plurality of connectors for guiding saidd fluid flow, said superposition of said two fluid flow connectors, and said two components of said fluid flow, including enabling said first component of the dynamically controllable oscillatory fluid flow to exit the device and said second component of said remaining constant circulatory fluid flow to return to said driver.

34. The system of claim 33, wherein said flow guide of said device includes a bifurcation.

35. The system of claim 33, wherein flow rate and amplitude of said constant circulatory fluid flow, said first component of the dynamically controllable oscillatory fluid flow, and said second component of said remaining constant circulatory fluid flow are controllable by using at least one three-way valve positioned in-line along said circuitous flow path of said device.

36. The system of claim 32, wherein said device includes:
(i) a driver/chopper unit for simultaneously driving and chopping a constant circulatory fluid flow along a circuitous flow path circuiting through the device, thereby generating the dynamically controllable oscillatory fluid flow from said constant circulatory fluid flow, such that said fluid flow becomes a superposition of two fluid flow components, first component is the dynamically controllable oscillatory fluid flow, second component is remaining said constant circulatory fluid flow;
(ii) a flow guide for guiding said superposition of said two fluid flow components and dividing a said superposition of said two fluid flow components into said first component of the dynamically controllable oscillatory fluid flow and into said second component of said remaining constant circulatory fluid flow; and
(iii) a plurality of connectors for guiding said fluid flow, said superposition of said two fluid flow components, and said two components of said fluid flow, including enabling said first components of the dynamically controllable oscillatory fluid flow to exit the device and said second component of said remaining constant circulatory fluid flow to return to said driver/chopper.

37. The system of claim 36, wherein said flow guide of said device includes a bifurcation.

38. The system of claim 36, wherein flow rate and amplitude of said constant circulatory fluid flow, said first component of the dynamically controllable oscillatory fluid flow, and said second component of said remaining constant circulatory fluid flow are controllable by using at least one three-way valve positioned in-line along said circuitous flow path of said device.

* * * * *